United States Patent [19]
Itoh

[11] Patent Number: 5,675,496
[45] Date of Patent: Oct. 7, 1997

[54] NUMERICAL CONTROL METHOD AND APPARATUS FOR CONTROLLING ACCELERATION AND DECELERATION OF A CONTROLLED OBJECT

[75] Inventor: Ietoshi Itoh, Tokyo, Japan

[73] Assignee: Sony Corporation, Japan

[21] Appl. No.: 305,609

[22] Filed: Sep. 14, 1994

[30] Foreign Application Priority Data

Sep. 16, 1993 [JP] Japan ................... 5-230252

[51] Int. Cl.$^6$ ........................................ G06F 19/00
[52] U.S. Cl. ................. 364/474.3; 364/174; 318/571
[58] Field of Search ......................... 364/474.3, 474.31, 364/148, 159, 167.01, 174, 474.28; 318/561, 564, 565, 568.18, 571, 567; 395/80, 85, 87, 88

[56] References Cited

U.S. PATENT DOCUMENTS

| | | | |
|---|---|---|---|
| 3,952,238 | 4/1976 | Cutler | 318/571 |
| 3,979,653 | 9/1976 | Cutler | 318/571 |
| 4,287,460 | 9/1981 | Nozawa et al. | 318/571 |
| 4,491,776 | 1/1985 | Veale | 318/561 |
| 4,555,758 | 11/1985 | Inaba et al. | 364/174 |
| 4,600,985 | 7/1986 | Nozawa et al. | 364/169 |
| 4,705,999 | 11/1987 | Soji et al. | 318/568 |
| 5,119,287 | 6/1992 | Nakamura et al. | 364/148 |
| 5,373,439 | 12/1994 | Jeon | 364/474.3 |

FOREIGN PATENT DOCUMENTS 63-182715  7/1988  Japan.

*Primary Examiner*—Reba I. Elmore
*Assistant Examiner*—Brian C. Oakes
*Attorney, Agent, or Firm*—Ronald P. Kananen

[57] ABSTRACT

To enable the free setting of an acceleration and deceleration pattern free from the amount of movement and the movement time a numerical control method controls the operation of a controlled object by a target function. The method which computes the target function Y(t) by an amount of change $\Delta Y_t$, a normalized target function y(t), and correction values $\beta$, $\delta$, defined as:

$$\delta_a(Tpa) = \frac{y_a(Tpa)}{y_d(Tpa)}$$

and $$\delta_d(Tpd) = \frac{y_d(Tpd)}{y_d(Tpd)}.$$

6 Claims, 11 Drawing Sheets

NUMERICAL CONTROL METHOD AND APPARATUS FOR CONTROLLING ACCELERATION AND DECELERATION OF A CONTROLLED OBJECT

BACKGROUND OF THE INVENTION

1. Field of the Invention

The present invention relates to a numerical control method and a numerical control system used for the control of various types of PTP (point to point) operations such as robot control, temperature control, camera focus control, slide control of a CD player, video disk, and the like, and DC point control of electrical circuits. More particularly, it relates to a numerical control method and numerical control system which enable free setting of a pattern of acceleration and deceleration free from the amount of movement or the time of movement.

2. Description of the Related Art

In general, in a servo control circuit, there is known a method for converting information on the phase and speed of a controlled object to a pattern, storing the same in advance in a memory, and later reading out the information in accordance with a target point to control the object at different points of time. In this case, the acceleration curve and deceleration curve are tinkered with so that the controlled object will be operated smoothly and within the desired time.

For example, the most general pattern of acceleration and deceleration is the triangular pattern shown in FIG. 1A, but since the acceleration jumps at three locations: the starting point of movement, the peak point, and the target point, it suffers form the disadvantage that a shock is easily given to the mechanical system. Further, this cannot be said to be optimal as the input to a servo control circuit.

Therefore, as shown in FIG. 1B, a proposal has been made of a pattern of acceleration and deceleration which provides a constant speed portion F as a stopping measure immediately before the target point. Even with this pattern of acceleration and deceleration, the jumps in acceleration at the starting point of movement and the peak point in the transition from acceleration to deceleration are not eliminated, so it also suffers from the disadvantage that the shock to the mechanical system cannot be completely resolved. Further, the disadvantage that the input is not the optimal one for a servo control system similarly remains.

On the other hand, to achieve a smooth operation at the time of acceleration and deceleration, a method has been proposed of storing in advance in a read-only-memory (ROM) the smooth pattern of acceleration and deceleration as shown in FIG. 2A. By this technique, problems in overshooting and precision of stopping are remarkably eliminated. However, the acceleration and deceleration times are made constant, so if the amount of movement is increased, the acceleration and deceleration curve also grows higher as shown in FIG. 2B and the problems in the precision of stopping at the time of a stop and shock to the mechanical system reappear. Further, it suffers from the disadvantage that the form of the acceleration and deceleration cannot be freely changed.

To overcome the above disadvantages, as shown in FIG. 3, a method has been proposed of classifying the amount of movement into large, medium, and small movements and storing in advance in a ROM patterns of acceleration and deceleration with acceleration times and deceleration times suitable for each of the same. The disadvantage nonetheless remains in that this results in a massive required memory capacity and further unnatural characteristics of the amount of movement and movement time, so is not preferable in terms of control. Further, it was not possible to freely change the acceleration and deceleration by this technique.

SUMMARY OF THE INVENTION

The present invention was made in consideration of the above disadvantages mentioned above, and thus, an object of the present invention is to enable free setting of the pattern of acceleration and deceleration free from the amount of movement or movement time with the assumption of realization of quick, smooth PTP operations.

To achieve the above-mentioned object, the numerical control method of the present invention lies in a numerical control method for controlling the operation of a controlled object by a target function, characterized by computing the target function $(Y(t))$ by an amount of change $(\Delta Y_t)$, a normalized target function $(y(t))$, and correction values $(\beta, \delta)$.

More specifically, it is characterized in that the target function is obtained by multiplying the amount of change $(\Delta Y_t)$, the normalized target function $(y(t))$, and the correction values $(\beta, \delta)$.

Further, for the correction values, when the normalized target function at the time of acceleration is $y_a(T)$, the normalized target function at the time of deceleration is $y_d(t)$, the acceleration time is $T_{pa}$, and the deceleration time is $T_{pd}$, the parameters $(\delta_a, \delta_d)$ having time dimensions defined by the following equations:

$$\delta_a(Tpa) = \frac{y_a(Tpa)}{y_a'(Tpa)}$$

$$\delta_d(Tpd) = \frac{y_d(Tpd)}{y_d'(Tpd)}$$

are included in the target function $(Y_a(t))$ at the time of acceleration as defined by the following equation:

$$\frac{\delta_a(Tpa)}{\delta_a(Tpa) + \delta_d(Tpd)}$$

or in the target function $(Y_d(t))$ at the time of deceleration as defined by the following equation:

$$\frac{\delta_d(Tpd)}{\delta_a(Tpa) + \delta_d(Tpd)}$$

More specifically, when the normalized target function at the time of acceleration is $y_a(T)$, the normalized target function at the time of deceleration is $y_d(t)$, the acceleration time $T_{pa}$, and the deceleration time is $T_{pd}$, the correction value is expressed in the case of a target function $(Y_a(t))$ at the time of acceleration as defined by the following equation:

$$\frac{\delta_a(Tpa)}{\delta_a(Tpa) + \delta_d(Tpd)} \cdot \beta_a$$

and in the case of a target function $(Y_d(t))$ at the time of deceleration as defined by the following equation:

$$\frac{\delta_d(Tpd)}{\delta_a(Tpa)+\delta_d(Tpd)} - \beta_d$$

and in that the parameters ($\beta_a$, $\beta_d$) are defined as defined by the following equation:

$$\beta_a = \frac{1}{y_a(Tpa)}$$

$$\beta_d = \frac{1}{y_d(Tpd)}$$

Note that when the normalized target function is a triangular acceleration and deceleration curve, the parameters ($\beta_a$, $\beta_d$) are 1.

On the other hand, to achieve the above-mentioned object, the numerical control system of the present invention provides a numerical control system for controlling the operation of a controlled object by a target function, characterized by being provided with an input unit which receives as input an amount of change ($\Delta Y_t$) and a normalized target function (y(t)), a correction value calculation unit which calculates correction values ($\beta$, $\delta$) based on the amount of change ($\Delta Y_t$) and normalized target function (y(t)), and a target function computation unit which computes the target function (Y(t)) based on the information from the input unit and the correction value calculation unit.

In a servo loop for controlling an arbitrary physical amount Y, reference values $Y_{ref}$ of the physical-state representing amount are input. In such a servo system, it is strongly demanded to quickly and smoothly move from a reference value $Y_{ref1}$ to a reference value $Y_{ref2}$.

For example, a PTP (point to point) operation which does not dictate the path from the reference point $Y_{ref1}$ to the reference value $Y_{ref2}$ is made use of in a wide range of fields such as robot control, temperature control, camera focus control, slide control of a CD player, video disk, and the like, and DC point control of electrical circuits.

Therefore, in the present invention, an algorithm has been constructed for enabling free and easy generation of new target functions, by introduction of a very small number of parameters, along with changes in the factors characterizing the target functions, i.e., (1) the pattern of acceleration and deceleration, (2) the amount of change, and (3) the changes in the acceleration time and deceleration time (including expansion and contraction of time axis).

That is, if the desired target functions $Y_a(t)$ and $Y_d(t)$ are normalized as $$Y_a(t)=\Delta Y_a-\beta_a-y_a(t)\quad 0\leq t\leq T_{pa}$$

$$Y_d(t)=\Delta Y_d-\beta_d-y_d(t)\quad 0\leq t\leq T_{pd}$$

the parameter $\beta$ may be found by any normalized target function as $$\beta_a = \frac{1}{y_a(T_{pa})}$$

$$\beta_d = \frac{1}{y_d(T_{pd})}$$

On the other hand, if another parameter $\delta$ having a time dimension is introduced as $$\Delta Y_a=\delta_a(T_{pa})-Y_a(T_{pa})$$

$$\Delta Y_d=\delta_d(T_{pd})-Y_d(T_{pd})$$

the parameter $\delta$ also may be found by any normalized target function as $$\delta_a(T_{pa}) = \frac{1}{\beta_a \cdot y_a(T_{pa})} = \frac{y_a(T_{pa})}{y_a(T_{pa})}$$

$$\delta_d(T_{pd}) = \frac{1}{\beta_d \cdot y_d(T_{pd})} = \frac{y_d(Y_{pd})}{y_d(T_{pd})}$$

Accordingly, the desired target functions are given as $$Y_a(t) = \frac{\delta_a(T_{pa})}{\delta_a(T_{pa})+\delta_d(T_{pd})} - \Delta Y_t - \beta_a - y_a(t)$$

$$0 \leq t \leq T_{pa}$$

$$Y_d(t) = \frac{\delta_d(T_{pd})}{\delta_a(T_{pa})+\delta_d(T_{pd})} - \Delta Y_t - \beta_d - y_d(t)$$

$$0 \leq t \leq T_{pd}$$

and further the above equations are given as the following even in the case of expansion and contraction of the time axis $$Y_a(t)_{t=t\alpha} = \frac{\delta_a(T_{pa})}{\delta_a(T_{pa})+\delta_d(T_{pd})} - \Delta Y_t - \beta_a - y_a(t)_{t=t\alpha}$$

$$0\leq t \leq \alpha T_{pa}$$

$$y_d(t)_{t=t\alpha} = \frac{\delta_d(T_{pd})}{\delta_a(T_{pa})+\delta_d(T_{pd})} - \Delta Y_t - \beta_d - y_d(t)_{t=t\alpha}$$

$$0\leq t \leq \alpha T_{pd}$$

so it is possible to easily compute them no matter what the amount of change $\Delta Y_t$, normalized target function y(t), and time.

BRIEF DESCRIPTION OF THE DRAWINGS

The above objects and features and other objects and features of the present invention will be more apparent from the following description made with reference to the accompanying drawings, in which.

DESCRIPTION OF THE PREFERRED EMBODIMENTS

Below, the principle and examples of application of the present invention will be explained in the following order with reference to the drawings:

Principle of Present Invention

Target Functions and Target Speed Functions
Problems
Principle of Generation of Target Functions
(1) Normalized Target Functions $y_a(t)$ and $y_d(t)$
(2) Parameter $\beta$
(3) Parameter $\delta$
(4) Matching of Acceleration Curve and Deceleration Curve
(5) Maximum Speed
(6) Expansion and Contraction of Time Axis
 (i) Normalized Target Function $y(t)$
 (ii) Parameter $\beta$
 (iii) Parameter $\delta(T_p)$

Examples of Application

Triangular Type
Sin Type
Exp Type
Combination

Principle of Present Invention

First, clarification will be made of the problems which arise when building an algorithm which enables free and easy production of new target functions through introduction of an extremely small number of parameters along with changes in the characterizing factors of target functions, that is,

[1] the parameter of acceleration and deceleration,
[2] the amount of movement (amount of change), and
[3] the acceleration time and deceleration time (including expansion and contraction of time axis)

and then the principle of production of a target function will be explained.

Target Functions and Target Speed Functions

Figure 1A:
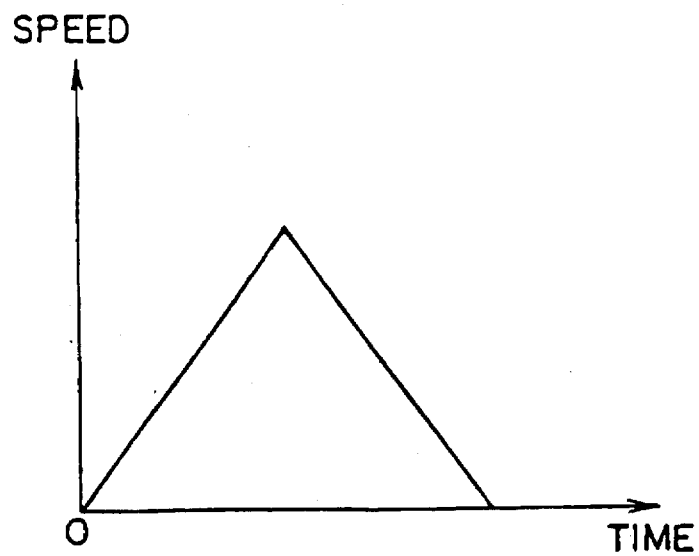
FIGS. 1A and 1B are graphs showing patterns of acceleration and deceleration.
Figure 1B:
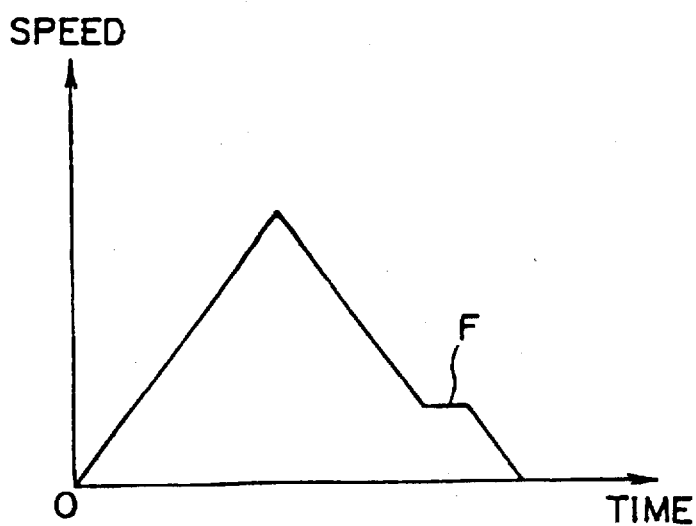
Figure 2A:
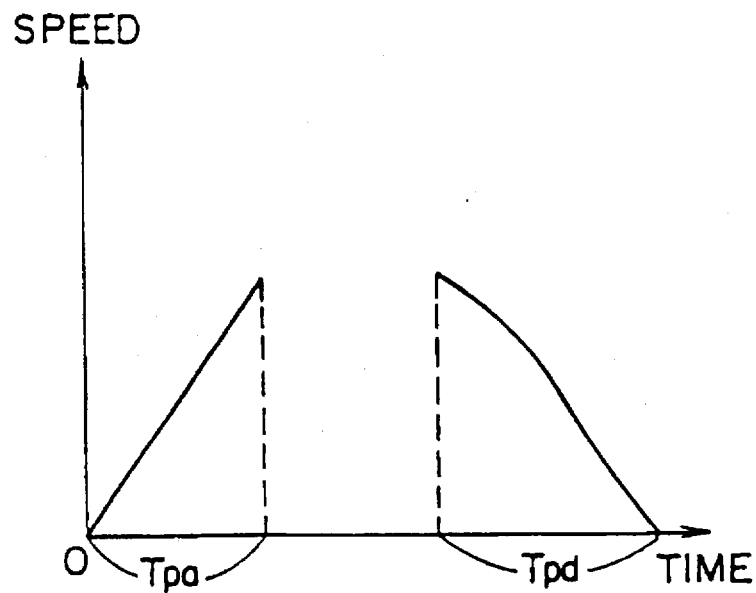
FIGS. 2A and 2B are similarly graphs showing patterns of acceleration and deceleration.
Figure 2B:
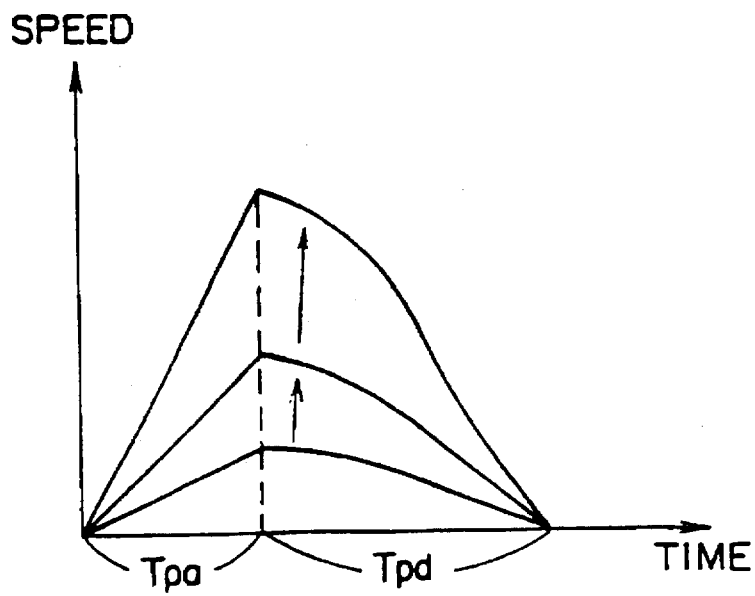
Figure 3:
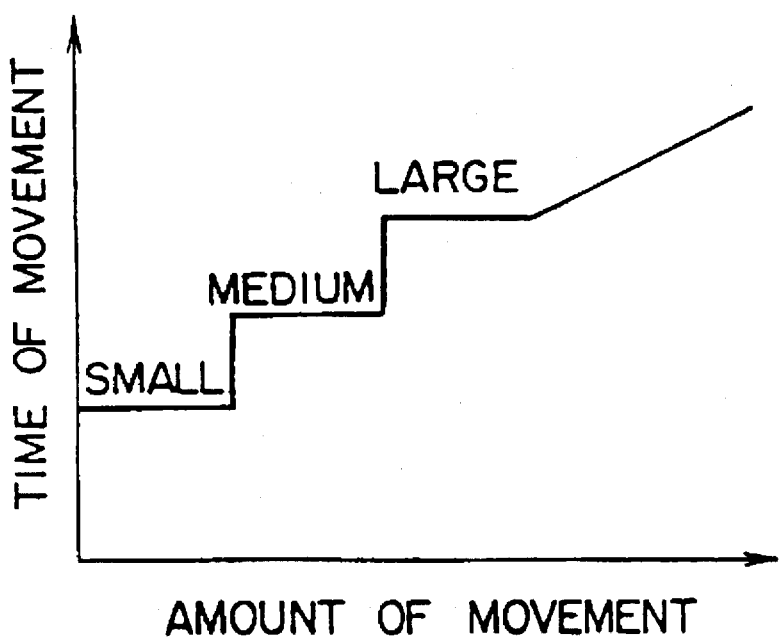
FIG. 3 is a graph similarly showing the relationship in the movement time with respect to the amount of movement in the related art.
Figure 4A:
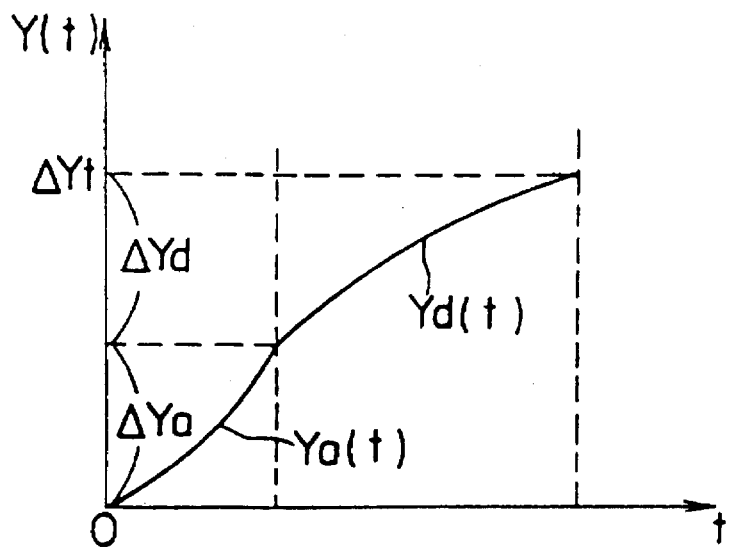
FIG. 4 is a graph showing the relationship between the target position and time for explaining the principle of the present invention and a graph showing the relationship between the target speed and time.
Figure 4B:
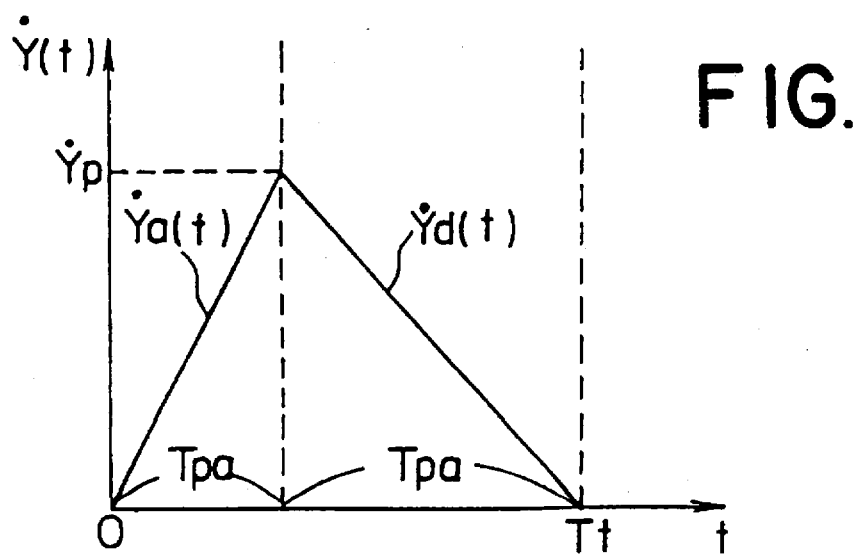
Figure 5:
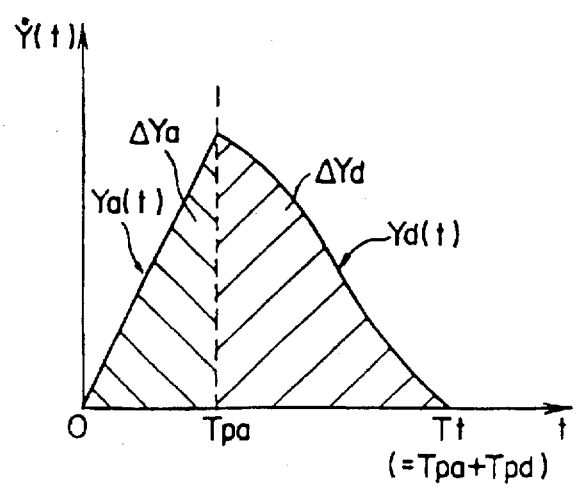
FIG. 5 is a similar graph showing the relationship between the target speed and time for explaining the principle of the present invention.
Figure 6A:
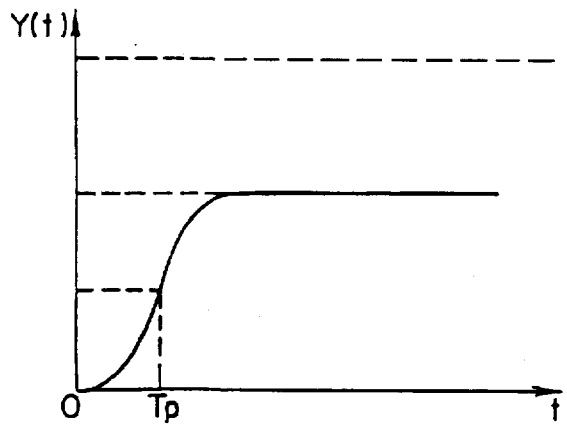
FIGS. 6A and 6B are graphs showing the relationship between the target position and time for explaining the principle of the present invention and a graph showing the relationship between the target speed and time.
Figure 6B:
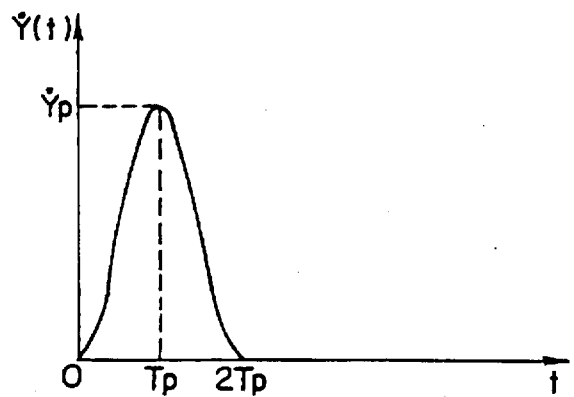

The symbols and parameters used in the above explanation are as shown in FIG. 4. Here, the acceleration time is given as $T_{pa}$, the deceleration time as $T_{pd}$, the total movement time as $T_t$, the amount of acceleration movement as $\Delta Y_a$, the amount of deceleration movement as $\Delta Y_d$, the total amount of movement $\Delta Y_t$, and the peak speed as $\dot{Y}_p$.

TABLE

| | |
|---|---|
| Tpa: | ACCELERATION TIME |
| Tpd: | DECELERATION TIME |
| Tt: | TOTAL MOVEMENT TIME (= Tpa + TPd) |
| ΔYa: | AMOUNT OF ACCELERATION MOVEMENT |
| ΔYd: | AMOUNT OF DECELERATION MOVEMENT |
| ΔYt: | TOTAL AMOUNT OF MOVEMENT (= ΔYa + ΔYd) |
| Ẏp: | PEAK SPEED |

Here, the following stand:

Total movement time $T_t$=acceleration time $T_{pa}$+ deceleration time $T_{pd}$ Total amount of movement $\Delta Y_t$=amount of acceleration movement $\Delta Y_a$+amount of deceleration movement $\Delta Y_d$ Further, when the time is t and the target value (position, temperature, voltage, etc.) is Y, Y(t) expresses the target function and the time differential dY(t)/dt of the target function expresses the target speed function. The relationship of the target value Y with respect to the time is shown at the top of FIG. 4, while the relationship of the target speed to the time is shown at the bottom of FIG. 4.

Problems

The main factors characterizing a target function may be said to be (1) the pattern of acceleration and deceleration, (2) the amount of movement $\Delta Y_t$, and (3) the expansion and contraction of the time axis, such as the acceleration time $T_{pa}$ and the deceleration time $T_{pd}$. Accordingly, a task given to the present invention is to construct an algorithm which enables free and easy production of a new target function by introduction of a very small number of parameters to deal with changes in such factors.

For example, when using the triangular acceleration and deceleration curve shown in FIG. 4, to ensure that no shock was given to a robot arm at the stopping point ($t=T_t$) of the arm, it was necessary to increase the deceleration time $T_{pd}$ or change the deceleration target function $Y_d(t)$dot to a smoother function. Further, a need arose for changing the shape of the target function or the acceleration and deceleration time along with changes in the amount of movement $\Delta Y_t$.

In the past, there were no clear cut guidelines regarding such changes, so everything was left to the ability of experienced designers. Sometimes, the control data had to be decided on after a process of repeated trial and error.

Accordingly, there were the problems that the control data decided on was governed by the ability of the designer and that inefficiency of design was caused.

Principle of Generation of Target Functions

Next, an explanation will be made of the principle for solving the above-mentioned task.

(1) Normalized Target Functions $y_a(t)$ and $y_d(t)$

According to the above-mentioned task, since it is necessary to deal with all types of the amount of movement $\Delta Y_t$, first the target function is normalized. That is, when the target function at acceleration is $Y_a(t)$ and the target function at deceleration is $Y_d(t)$, the following is set $$Y_a(t) = \Delta Y_a \cdot \beta_a \cdot y_a(t) \quad 0 \leq t \leq T_{pa} \tag{1}$$

$$Y_d(t) = \Delta Y_d \cdot \beta_d \cdot y_d(t) \quad 0 \leq t \leq T_{pd} \tag{2}$$

Here, $y_a(t)$ and $y_d(t)$ in equation (1) and equation (2) are dimension-less smooth continuous functions. These are referred to as normalized target functions.

Note that in the case of a normalized target function, the following stands:

$$Y_a(0)=0,\ y_d(0)=0 \tag{3}$$

and $y_a(t)$ gives the pattern (curve) at the time of acceleration and $y_d(t)$ gives the pattern (curve) at the time of deceleration. That is, by changing the normalized target functions $y_a(t)$ and $y_d(t)$ in accordance with need, it is possible to change the shape of the target function.

Note that in equation (2), $y_d(t)$ is defined by $0 \leq t \leq T_{pd}$, but it is possible to change to deceleration by applying a reversal operation of the time axis. More specifically, it is possible to substitute $T_{pd}+T_{pa}-t$ in place of t in equation (2).

(2) Parameter $\beta$

Further, $\beta_a$ and $\beta_d$ in equation (1) and equation (2) are dimension-less parameters and are introduced for the following two purposes.

First, the first purpose is to give a degree of freedom to the selection of the normalized target function $y(t)$. That is, when using the triangular pattern as shown in FIG. 4, the normalized target function $y_a(t)$ is introduced to enable absorption by the parameter $\beta$ no matter if multiplied by $t^2/T_p^2$, $10t^2/T_p^2$, or any other coefficient.

Further, the effect of the parameter $\beta$ is not exhibited that much in the case of a simple function such as a triangular pattern, but a much more remarkable effect is obtained if a complicated function such as a later mentioned exp type pattern is adopted.

Further, the second purpose of the introduction of $\beta$ is to establish a relationship between the normalized target function $y(t)$ and the servo loop characteristic. That is, the normalized target function $y(t)$ is an extremely important factor for a certain servo loop. By defining this relationship by $\beta$, use may be made of it when producing a target function.

Further, from equation (1) and equation (2), $$Y_a(T_{pa})=\Delta Y_a-\beta_a \cdot y_a(T_{pa})=\Delta Y_a \tag{1'}$$

$$Y_d(T_{pd})=\Delta Y_d-\beta_d \cdot y_d(T_{pd})=\Delta Y_d \tag{2'}$$

so, $\beta_a$ and $\beta_d$ may be expressed by $$\beta_a = \frac{1}{y_a(T_{pa})} \tag{3}$$

$$\beta_d = \frac{1}{y_d(T_{pd})} \tag{4}$$

If a normalized target function is determined by equation (4), it is possible to find $\beta_a$ and $\beta_d$ by calculation.

(3) Parameter $\delta$

As stated in relation to the task of the present invention mentioned earlier, the algorithm for producing the target function must be able to be freely used even with respect to expansion or contraction in the direction of the time axis, so another parameter $\delta$ (sec) is introduced. This parameter $\delta$ is defined as follows:

$$\Delta Y_a = \delta_a(T_{pa}) \cdot \dot{Y}_a(T_{pa}) \tag{5}$$

$$\Delta Y_d = \delta_d(T_{pd}) \cdot \dot{Y}_d(T_{pd}) \tag{6}$$

Figure 7:
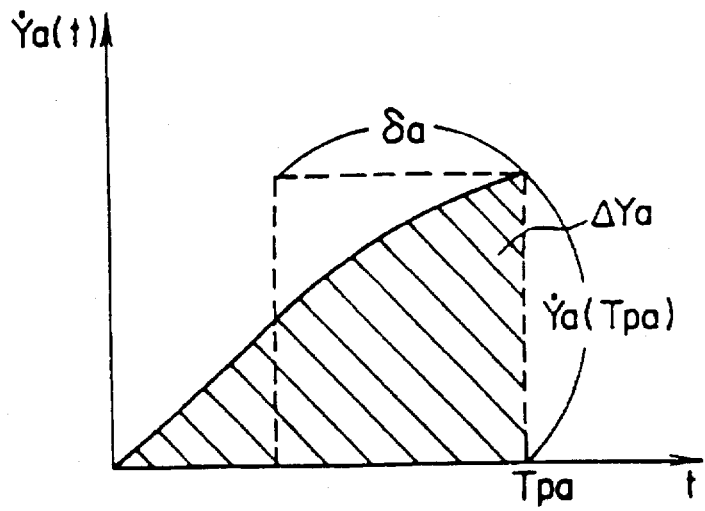
FIG. 7 is a graph showing the relationship between the target speed and time for explaining the parameter $\delta$ according to the present invention.

That is, the parameter $\delta$ means the length of the horizontal axis (time axis) of the rectangular shape of the height $\dot{Y}_a(T_{pa})$ (shown by the dotted line in FIG. 7 which gives an area equal to the area $\Delta Y_a$ surrounded by the acceleration (deceleration) curve as shown in FIG. 7. Note that this is expressed as a function of $T_p$ like $\delta(T_p)$ because the value of $\delta$ is dependent on $T_{pa}$ and $T_{pd}$.

The parameter $\delta$ may be found in the following way:

That is, if the two sides of equation (1) and equation (2) are differentiated by the time t and $t=T_p$ substituted in them, then the result becomes $$\begin{aligned}\dot{Y}_a(T_{pa}) &= \Delta Y_a - \beta_a \cdot \dot{y}_a(T_{pa}) \\ &= \delta_a(T_{pa}) \cdot \dot{Y}_a(T_{pa}) - \beta_a \cdot \dot{y}_a(T_{pa})\end{aligned} \tag{7}$$

$$\begin{aligned}\dot{Y}_d(T_{pd}) &= \Delta Y_d - \beta_d \cdot \dot{y}_d(T_{pd}) \\ &= \delta_d(T_{pd}) \cdot \dot{Y}_d(T_{pd}) - \beta_d \cdot \dot{y}_d(T_{pd})\end{aligned} \tag{8}$$

where, $$\delta_a(T_{pa}) = \frac{1}{\beta_a \cdot \dot{y}_a(T_{pa})} = \frac{y_a(T_{pa})}{\dot{y}_a(T_{pa})} \tag{9}$$

$$\delta_d(T_{pd}) = \frac{1}{\beta_d \cdot \dot{y}_d(T_{pd})} = \frac{y_d(T_{pd})}{\dot{y}_d(T_{pd})} \tag{10}$$

If the normalized target functions are determined by these equation (9) and equation (10), then it is possible to find the parameter $\delta$ by calculation.

(4) Matching of Acceleration curve and Deceleration Curve

Up to here, the acceleration and deceleration have been treated independently, but the target speed function which is produced in the end must be continuously linked around $t=T_{pa}$. Accordingly, below, the relationship linking acceleration and deceleration is found.

If the total amount of movement is $\Delta Y_t$ and the total movement time is $T_t$, then as mentioned above, the following relationship stands:

$$\Delta Y_t = \Delta Y_a + \Delta Y_d \tag{11}$$

$$T_t = T_{pa} + T_{pd} \tag{12}$$

Figure 8:
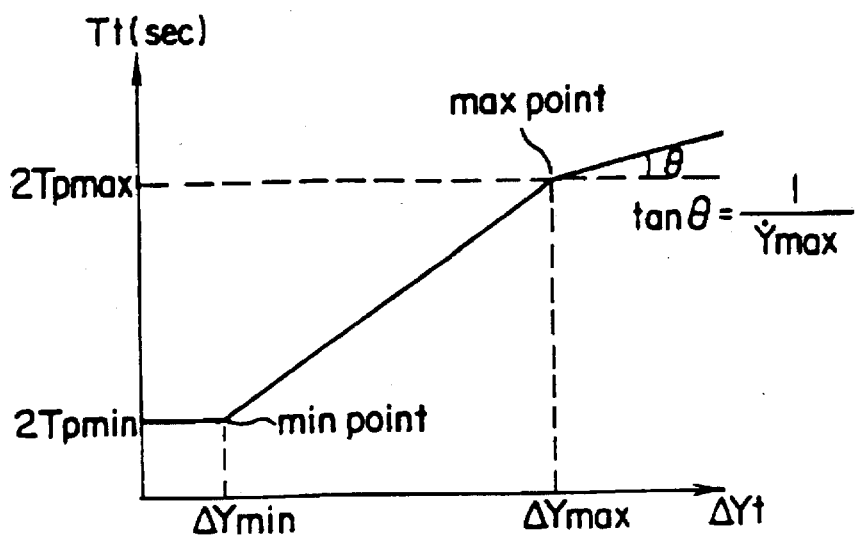
FIG. 8 is a graph showing the relationship between the movement distance and movement time in the present invention.
Figure 9:
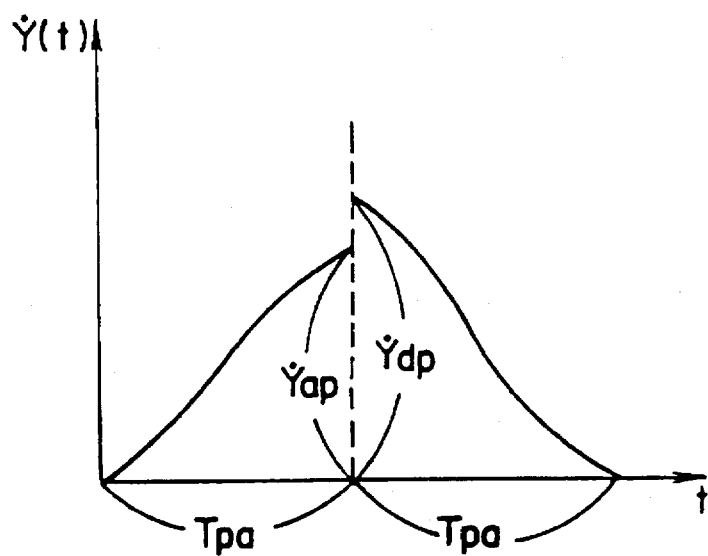
FIG. 9 is a graph showing the relationship between the target speed and time for explaining matching of the acceleration and deceleration curves of the present invention.

In this case, the total amount of movement $\Delta Y_t$ and the total movement time $T_t$ are by nature determined by a large system including the servo system and the algorithm of the present invention does not have anything to do with the determination of the system. In particular, the movement time $T_t$, that is, $T_{pa}$ and $T_{pd}$, is an important factor in the system and is determined by the magnitude of the load of the servo system and other physical situations, such as the capacities of the actuator and power system, etc. For example, as shown in FIG. 8, there are cases where it is determined as a function of $\Delta Y_t$:

Further, if the peak speed $\dot{Y}_a(T_{pa})$ at the time of acceleration and the peak speed $\dot{Y}_d(T_{pd})$ at the time of deceleration are not equal, then as shown in FIG. 9, the speed jumps around $t=T_{pa}$, which is not preferable as a target function. Therefore, if the two peak speeds are made equal, then $$\dot{Y}_a(T_{pa}) = \dot{Y}_d(T_{pd}) = \dot{Y}_p \tag{13}$$

and from equation (5), equation (6), and equation (11), $$\Delta Y_t = \{\delta_a(T_{pa}) + \delta_d(T_{pd})\}\dot{Y}_p \tag{14}$$

is obtained.

The acceleration time $T_{pa}$ and deceleration time $T_{pd}$ are already determined, so $\delta_a(T_{pa})$ and $\delta_d(T_{pd})$ become known from equation (9) and equation (10) and in the end the peak speed $\dot{Y}_p$ is determined by the following equation (15):

$$\dot{Y}_p = \frac{\Delta T_t}{\delta_a(T_{pa}) + \delta_d(T_{pd})} = \frac{\Delta Y_t}{\frac{y_a(T_{pa})}{\dot{y}_a(T_{pa})} + \frac{y_d(T_{pd})}{\dot{y}_d(T_{pd})}} \quad (15)$$

Therefore, from equation (5) and equation (6), the amount of movement during acceleration $\Delta Y_a$ and the amount of movement during deceleration $\Delta Y_d$ may be found by the following equation (16) and equation (17).

$$\Delta Y_a = \frac{\delta_a(T_{pa})}{\delta_a(T_{pa}) + \delta_d(T_{pd})} \cdot \Delta Y_t \quad (16)$$

$$\Delta Y_d = \frac{\delta_d(T_{pd})}{\delta_a(T_{pa}) + \delta_d(T_{pd})} \cdot \Delta Y_t \quad (17)$$

Therefore, if equation (16) and equation (17) are substituted in equation (1) and equation (2), $$Y_a(t) = \frac{\delta_a(T_{pa})}{\delta_a(T_{pa}) + \delta_d(T_{pd})} \cdot \Delta Y_t \cdot \beta_a \cdot y_a \quad (18)$$

$$0 \leq t \leq T_{pa}$$

$$Y_d(t) = \frac{\delta_d(T_{pd})}{\delta_a(T_{pa}) + \delta_d(T_{pd})} \cdot \Delta Y_t \cdot \beta_d \cdot y_d(t) \quad (19)$$

$$0 \leq t \leq T_{pd}$$

The right sides of equation (18) and equation (19) are all determined, so it becomes possible to use these two equations to produce the target function $Y_a(t)$ of acceleration and the target function $Y_d(t)$ of deceleration.

(5) Maximum Speed

When a target function with symmetrical right and left sides, that is, a target function of $Y_a(t)=Y_d(t)$, is used at the time $t=T_{pa}$, the speed $\dot{Y}_p$ of the peak point increases if the amount of movement $\Delta Y_t$ increases. However, since there is a maximum speed $\dot{Y}_{max}$ in an actuator, the target speed function grows as shown in FIG. 10 for example.

In this case, the area enclosed by the speed curve and the time axis is the amount of movement $\Delta Y_t$, and the following stands:

$$\Delta Y_{t1} < \Delta Y_{t2} < Y_{t3} < \ldots < \Delta Y_{t6} \quad (20)$$

Figure 10:
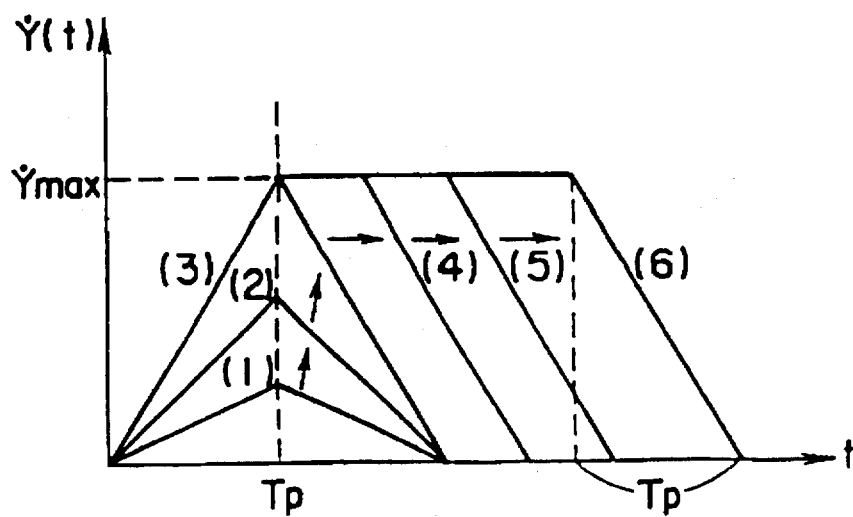
FIG. 10 is a graph showing the relationship between the target speed and time for explaining the maximum speed in the present invention.

In particular, with the amount of movement $\Delta Y_{t3}$ of (3) shown in FIG. 10, there is is a match with the maximum speed $\dot{Y}_{MAX}$, so in this sense if $\Delta Y_{t3}$ is written as $\Delta Y_{tMAX}$, then from equation (5) and equation (6), the following stands:

$$\Delta Y_{max} = \delta(T_p) \cdot \dot{Y}_{max} \quad (21)$$

Using this, when the amount of movement $\Delta Y_t$ and the peak time $T_p$ are given, it is possible to find the speed $\dot{Y}_p$ of the peak point from $$\Delta Y_t = \delta(T_p) \cdot \dot{Y}_p \quad (22)$$

and judge if this is larger or smaller than the maximum speed $\dot{Y}_{MAX}$ of the actuator and thereby Judge if the operation is at the maximum speed (trapezoidal operation (4) to (6) in FIG. 10. The parameter $\delta(T_p)$ may be used in this way as well. Note that even if the patterns of acceleration and deceleration differ, they may be similarly applied.

Therefore, in FIG. 10, when the amount of movement is given as $\Delta T_{t5}$ and the acceleration and deceleration time is given as $T_p$, it is possible to judge that $$\delta(T_p) \cdot \dot{Y}_{max} = \Delta Y_{max} < \Delta Y_{t5} \quad (23)$$

Therefore, the result is $$\Delta Y_{t5} = \Delta Y_{max} + \Delta Y_0 \quad (24)$$

and the amount of movement $\Delta Y_0$ of the maximum speed portion can be easily calculated.

In the same way, the time $T_0$ for $\Delta Y_0$ to be moved at the speed of $\dot{Y}_{MAX}$ can be found by the following equation (25):

$$T_0 = \frac{\Delta Y_0}{\dot{Y}_{max}} \quad (25)$$

Figure 11:
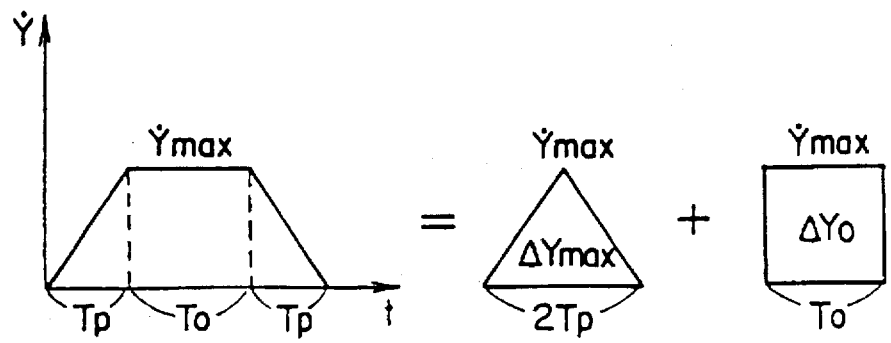
FIG. 11 is a similar conceptual view for explaining the maximum speed in the present invention.

As a result, the total movement time $T_t$ in this case becomes as in the following equation (26). This situation is shown in FIG. 11.

$$T_t = 2T_p + T_0 = 2T_p + \frac{\Delta Y_0}{\dot{Y}_{max}} \quad (26)$$
$$= 2T_p + \frac{\Delta Y_{t5} - \Delta Y_{max}}{\dot{Y}_{max}}$$

Note that in this explanation, the peak time $T_p$ was treated as a constant, but in the actual application, the peak time $T_p$ is changed in accordance with the amount of movement $\Delta Y_t$ as shown in FIG. 8 and the min point and max point shown in FIG. 8 appear due to the presence of the f-characteristic of the servo loop or the motor maximum speed. Further, this application is easy even if the form of the acceleration and deceleration changes.

(6) Expansion and Contraction of Time Axis

The total movement time $T_t$, the acceleration and deceleration times $T_{pa}$ and $T_{pd}$ etc. are determined by the situation and laws of the control system such as the actuator, load, and power system. Therefore, consideration is given to a method for producing a target function in accordance with the determined times, that is, producing a target function with respect to the expansion and contraction of the time axis.

Figure 12:
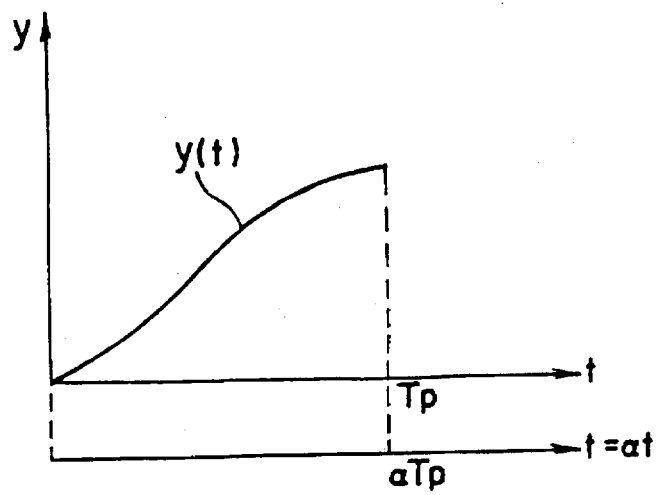
FIG. 12 is a graph showing the relationship between the target position and time for explaining the expansion and contraction of the time axis in the present invention.

The situation when multiplying the time axis by $\alpha$ when the normalized target function $y(t)$ is given is shown in FIG. 12. An object in this case is to derive an equation when the equation (18) and equation (19) of the target function are subjected to expansion or contraction of the time axis.

Therefore, considering the effects of expansion and contraction of the time axis on the various amounts included at the right sides of equation (18) and equation (19), the following is concluded:

(i) Normalized target function $y(t)$ From the graph shown in FIG. 12, $$y(t) \xrightarrow{\tau = \alpha t} y(t)_{t=\tau/\alpha} = y(\tau/\alpha) \quad (27)$$

so $$y(t_p) = y(\alpha T_p/\alpha) \quad (28)$$

stands and the value at $t=T_p$ and the value at $\tau=\alpha T_p$ become equal.

(ii) Parameter $\beta$

From equation (4), equation (5), and equation (28), $$\beta = \frac{1}{\dot{y}(T_p)} = \frac{1}{\dot{y}(\alpha T_p/\alpha)} \quad (29)$$

so the value of the parameter $\beta$ does not change depending on the expansion or contraction of the time axis.

(iii) Parameter $\delta(T_p)$

From equation (9) and equation (10), $$\delta(T_p) = \frac{y(T_p)}{\dot{y}(T_p)} \quad (30)'$$

Here, if the time axis is multiplied by $\alpha$, then the result is $$\delta(\alpha T_p) = \frac{y(t)_{t=t/\alpha}}{\dot{y}(t)_{t=t/\alpha}}\bigg|_{\tau=\alpha T_p} \quad (30)$$

$$= \frac{y(\tau/\alpha)}{dy(\tau/\alpha)/d\tau}\bigg|_{\tau=\alpha T_p}$$

$$= \alpha \frac{y(\alpha T_p/\alpha)}{\dot{y}(\alpha T_p/\alpha)} = \alpha \frac{y(T_p)}{\dot{y}(T_p)}$$

$$= \alpha \delta(T_p)$$

and the value of $\delta$ is multiplied by $\alpha$ equal to the multiplication of the time axis by $\alpha$. This is understood as well from the fact that $\delta$ has a time (sec) dimension and the physical meaning of the parameter $\delta$ explained in FIG. 7.

In this way, the normalized target function $y(t)$, the parameter $\beta$, and the parameter $\delta$ are transformed as follows by the expansion or contraction of the time axis (multiplication by $\alpha$):

$$y(t) \xrightarrow{\tau=\alpha t} y(t)_{t=t/\alpha} \quad (30'')$$

$$\beta \longrightarrow \beta$$

$$\delta(T_p) \longrightarrow \alpha\delta(T_p)$$

Accordingly, considering the expansion and contraction of the time axis ($\tau=\alpha t$) in the target function found by equation (18) and equation (19), the result becomes:

$$Y_a(t)_{t=t/\alpha} = \frac{\delta_a(T_{pa})}{\delta_a(T_{pa})+\delta_d(T_{pd})} - \Delta Y_t - \beta_a \cdot y_a(t)_{t=t/\alpha} \quad (18')$$

$$0 \leq t \leq \alpha t_{pa}$$

$$Y_d(t)_{t=t/\alpha} = \frac{\delta_d(T_{pd})}{\delta_a(T_{pa})+\delta_d(T_{pd})} - \Delta Y_t - \beta_d \cdot y_d(t)_{t=t/\alpha} \quad (19')$$

$$0 \leq t \leq \alpha t_{pd}$$

and equation (18') and equation (19') are derived equations of the target functions $Y_a(t)$ and $Y_d(t)$ enabling free change of the shape of the acceleration and deceleration, the amount of movement, and the movement time ($\alpha$).

Examples of Application

Next, the present invention will be explained in further detail by illustrating specific normalized target functions set based on the principle of the present invention explained above. However, the present invention may be applied to any normalized target function. The specific examples shown below of course are only examples of the same.

Triangular Type

Figure 13:
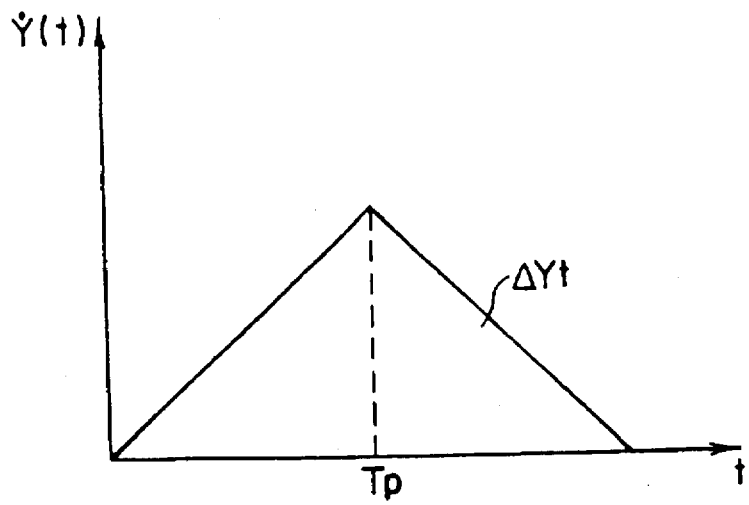
FIG. 13 is a graph showing a triangular type acceleration and deceleration pattern of an example of application of the present invention.

Regarding the triangular acceleration and deceleration pattern shown in FIG. 13, the normalized target function $y(t)$ is determined so as to be dimensionless, so for example if $$Y(t) = \frac{1}{T_p^2} t^2 \quad (31)$$

the target speed function becomes the following by differentiation of the two sides of equation (31) by the time t:

$$\dot{y}(t) = \frac{2}{T_p^2} t \quad (32)$$

On the other hand, according to equation (4) and equation (5), the parameter $\beta$ is $$\beta = \frac{1}{\dot{y}(T_p)} = 1 \quad (33)$$

so from equation (9) and equation (10), the parameter $\delta$ becomes $$\delta(T_P) = \frac{y(T_p)}{\dot{y}(T_p)} = \frac{\frac{1}{T_p^2} T_p^2}{\frac{2}{T_p^2} T_p} = \frac{1}{2} T_p \quad (34)$$

In such a triangular acceleration and deceleration pattern, there is the advantage that calculation at the time of finding the target function is easy, but since the acceleration is discontinuous, there are the disadvantages that shock is given to the servo system and the movement time cannot be shortened.

Sine Type

Figure 14:
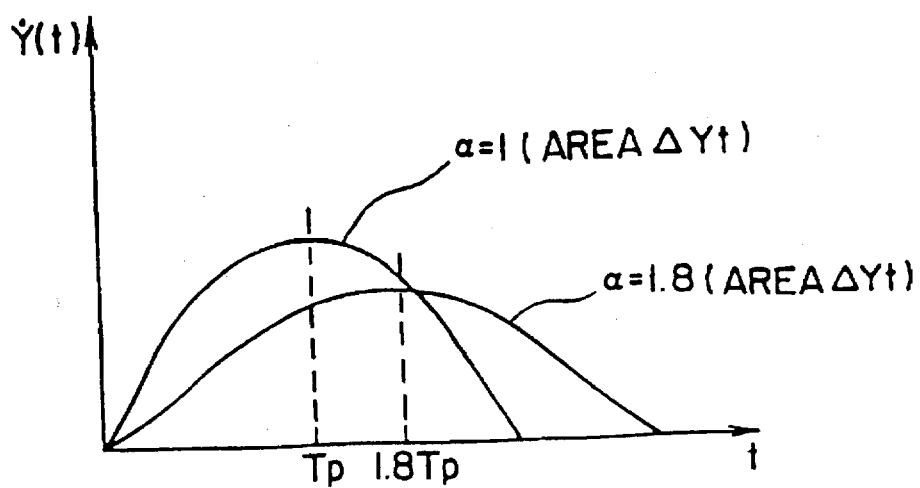
FIG. 14 is a graph showing the sine type acceleration and deceleration pattern of another example of application of the present invention.

In the sine type deceleration pattern shown in FIG. 14, the following stand:

$$y(t) = -\sin\frac{\pi}{T_p} t + \frac{\pi}{T_p} t \quad (36)$$

$$\dot{y}(t) = -\frac{\pi}{T_p} \cos\frac{\pi}{T_p} t + \frac{\pi}{T_p} \quad (37)$$

$$\beta = \frac{1}{\dot{y}(T_p)} = \frac{1}{2\pi} \quad (38)$$

$$\delta(T_p) = \frac{y(T_p)}{\dot{y}(T_p)} = \frac{\pi}{\frac{\pi}{T_p} + \frac{\pi}{T_p}} = \frac{1}{2} T_p \quad (39)$$

so like with the above-mentioned triangular type, if use is made the normalized target functions the same as at acceleration and deceleration ($y_a(t)=y_d(t)$) and the acceleration and deceleration times are equal ($T_{pa}=T_{pd}$), the target function becomes as follows if the amount of movement is made $\Delta Y_t$:

$$Y(t/\alpha) = \frac{1}{2} \Delta Y_t \frac{1}{2\pi} \left\{ \sin\frac{\pi t}{T_p\alpha} + \frac{\pi t}{T_p\alpha} \right\} \quad (40)$$

Note that during deceleration, the above $Y(t/\alpha)$ may be returned back at $t=(\alpha T_p)$.

In such a sine type acceleration and deceleration pattern, calculation at the time of finding a target function becomes easy and further the function is regular sine wave, so phase control of the input and output becomes possible. However, there is the defect of a long time until stopping.

Exp Type

The exponential type acceleration and deceleration pattern is one of the optimal target functions considering the characteristic of a positional servo loop (so called "f-characteristic"). Further, this target function is a function which can be infinitely differentiated at all points, so it has the advantage of not causing unnecessary vibration in the mechanical system. Further, calculation becomes easier if the servo loop is simulated by software.

Figure 15A:
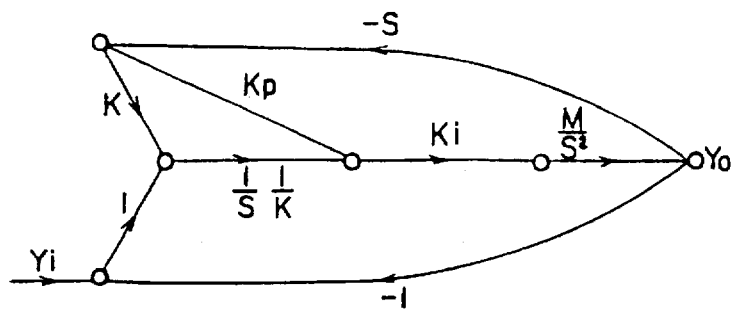
FIG. 15A is a signal flow chart showing the exponential type acceleration and deceleration pattern of a still other example of application of the present invention.

FIG. 15A is a signal flow chart of the servo loop. Assuming that as the target function the step input of the amount of movement $\beta \Delta Y_t/2$ $$Y_i(s) = \frac{\beta \cdot \Delta Y_t/2}{s} \quad (41)$$

is input, since there is no input faster than the step as $Y_i$, the output changes most quickly by this input.

In FIG. 15A, if the transfer function of $Y_i \to Y_O$ is calculated, it becomes as shown in the following equation (42):

$$Y_0(s) = \frac{1}{(1+T_1 s)(1+T_2 s)(1+T_3 s)} \cdot \frac{\beta \cdot \Delta Y_t/2}{s} \quad (42)$$

where, $$\frac{K}{K_p M} = T_1 T_2 T_3 \quad (43)$$

$$K_p K = T_1 T_2 + T_2 T_3 + T_3 T_1$$
$$K = T_1 + T_2 + T_3$$

, and $T_1$, $T_2$ and $T_3$ are the time constants in the third servo-loop.

On the other hand, if this equation (41) is subjected to an inverse-Laplace transformation, then $$Y_0(t) = \beta \frac{\Delta Y_t}{2} = \quad (44)$$
$$1 - \frac{T_1^2}{(T_1-T_2)(T_1-T_3)} \exp(-t/T_1) +$$
$$\frac{T_2^2}{(T_1-T_2)(T_2-T_3)} \exp(-t/T_2) -$$
$$\frac{T_3^2}{(T_1-T_3)(T_2-T_3)} \exp(-t/T_3)$$

If the two sides are differentiated by the time t to find the speed, then the result is $$\dot{Y}_0(t) = \beta \frac{\Delta Y_t}{2} = \quad (45)$$
$$1 - \frac{T_1}{(T_1-T_2)(T_1-T_3)} \exp(-t/T_1) -$$
$$\frac{T_2}{(T_1-T_2)(T_2-T_3)} \exp(-t/T_2) +$$
$$\frac{T_3}{(T_1-T_3)(T_2-T_3)} \exp(-t/T_3)$$

Figure 15B:
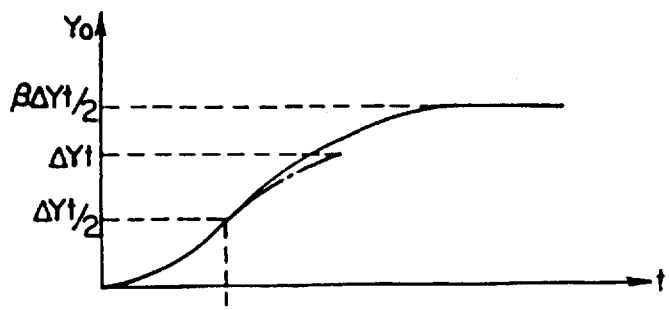
FIG. 15B is a graph showing the relationship between the target position and time.
Figure 15C:
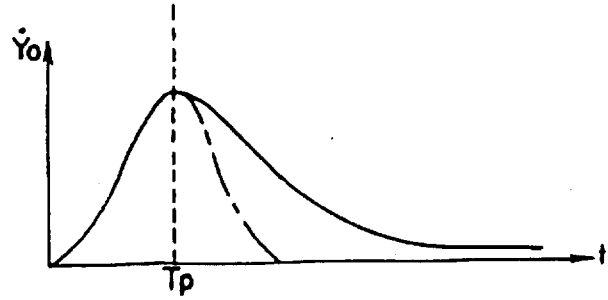
FIG. 15C is a graph showing the relationship between the target speed and time.

If this movement distance $Y_0(t)$ and speed $\dot{Y}_0(t)$ are shown with respect to time, then they can be expressed as shown in FIG. 15B and FIG. 15C. At this time, it is understood that the distance of movement up to the time $T_p$ becomes:

$$Y_0(T_p) = \int_0^{T_p} \dot{Y}(t) dt = \frac{\Delta Y_t}{2} \quad (46)$$

Therefore, if the speed $\dot{Y}_0(t)$ between $0 \leq t \leq T_p$ is reversed with respect to the time axis at the time $t=T_p$, then the target functions shown by the dotted lines in FIGS. 15B and 15C are obtained.

This target function is output to the step input of the servo loop shown in FIG. 15A, so it is the maximum speed for the servo loop. Further, the function is filtered, so it is considered the most suitable as the input.

Further, the $\beta$ defined by equation (41) is the same as the parameter $\beta$ of equation (4) defined by the normalized target function as will be understood from a comparison of the forms of equation (44) and equation (45) and equation (18') and equation (19').

Incidentally, the normalized target function of the exp type acceleration and deceleration pattern and the parameters $\beta$ and $\delta$ may be found as follows:

First, from the form of equation (44), the normalized target function y(t) is $$y(t) = 1 - \frac{T_1^2}{(T_1-T_2)(T_1-T_3)} \exp(-t/T_1) + \quad (47)$$
$$\frac{T_2^2}{(T_1-T_2)(T_2-T_3)} \exp(-t/T_2) -$$
$$\frac{T_3^2}{(T_1-T_3)(T_2-T_3)} \exp(-t/T_3)$$

By differentiating the two sides by the time t, the result becomes $$\dot{y}(t) = 1 - \frac{T_1}{(T_1-T_2)(T_1-T_3)} \exp(-t/T_1) - \quad (48)$$
$$\frac{T_2}{(T_1-T_2)(T_2-T_3)} \exp(-t/T_2) +$$
$$\frac{T_3}{(T_1-T_3)(T_2-T_3)} \exp(-t/T_3)$$

Therefore, from equation (4), the parameter $\beta$ is given by $$\beta = 1 / \left\{ \begin{array}{l} 1 - \frac{T_1^2}{(T_1-T_2)(T_1-T_3)} \exp(-T_p/T_1) + \\ \frac{T_2^2}{(T_1-T_2)(T_2-T_3)} \exp(-T_p/T_2) - \\ \frac{T_3^2}{(T_1-T_3)(T_2-T_3)} \exp(-T_p \cdot T_3) \end{array} \right\} \quad (49)$$

At this time, $T_p$ is an inherent value for the normalized target function y(t) and is the same even if the amount of movement changes. Further, if the time axis is multiplied by $\alpha$, the exp $(-t/T_1)$ in equation (49) is transformed to exp $(-t/\alpha T_1)$, but at the same time, $T_p \to \alpha T_p$, so in the end $$\beta = \frac{1}{y(T_p)} = \frac{1}{y(\alpha T_p/\alpha)} \quad (50)$$

and the same value is obtained.

Next, the parameter $\delta$ becomes $$\delta(T_p) = \frac{2 \dot{y}(T_p)}{y(T_p)} \quad (51)$$

but if the time axis is multiplied by $\alpha$, then the result becomes $$\delta(\alpha T_p) = \alpha \delta(T_p) \quad (52)$$

Note that if the signal flow chart shown in FIG. 15A is digitalized and realized by software and steps are input, then it is possible to easily find the target function even without complicated calculations as shown in the above-mentioned equation (44) and equation (45).

Combinations

The specific examples described above were examples of use of the same type of functions for the normalized target functions of acceleration and deceleration, but in the present invention, it is also possible to use patterns where the normalized target functions for acceleration and deceleration differ.

Figure 16A:
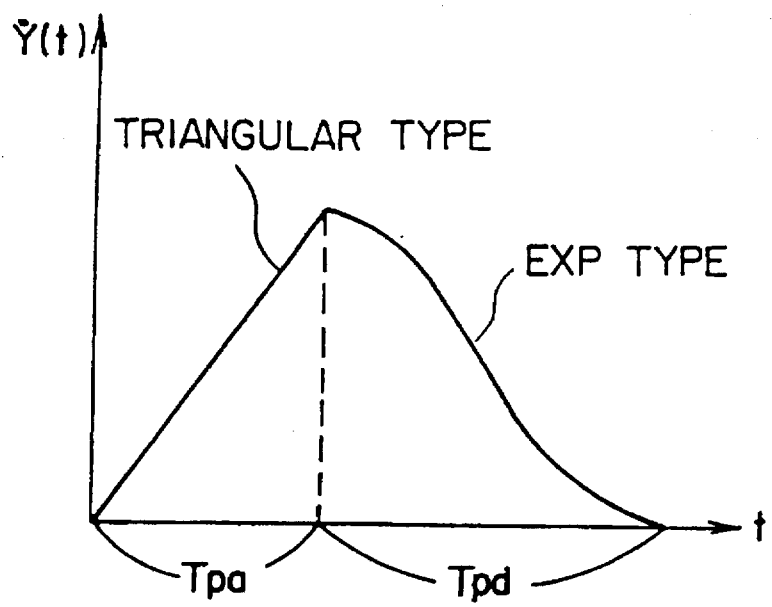
FIGS. 16A and 16B are graphs showing other examples of application of the present invention.
Figure 16B:
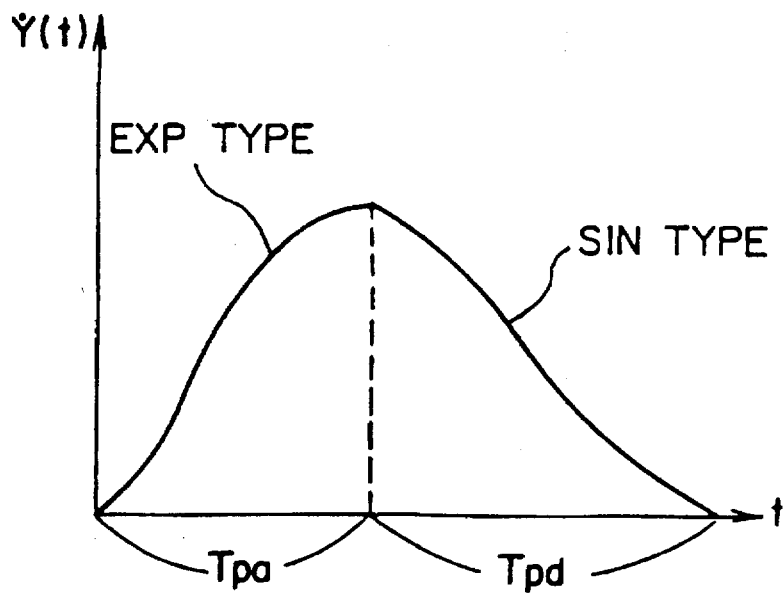

For example, the acceleration and deceleration pattern shown in FIG. 16A is an example of use of a triangular type acceleration pattern and an exp type deceleration pattern. Further, the acceleration and deceleration pattern shown in FIG. 16B is an example of use of the exp type acceleration pattern and the sine type deceleration pattern.

In short, which kind of acceleration and deceleration pattern to use may be determined by the characteristics of the servo loop, the characteristics of the load of the actuator, etc., for example.

Note that the embodiments explained above were given to facilitate the understanding of the present invention and were not given to limit the present invention. Accordingly, the elements disclosed in the above embodiments include all design modifications and equivalents falling under the technical scope of the present invention.

For example, when the above-mentioned normalized target functions are complicated and the types of the same are complicated, if real time processing is required, a load may be placed on the calculation time of the CPU. In such a case, when the system is started up and initialized, the normalized target functions are calculated in advance just once and the results are stored in the memory. Further, when performing processing in real time, it is possible to perform linear interpolation in accordance with need while referring to the memory.

As explained above, it is possible to freely set the acceleration and deceleration pattern regardless of the amount of movement or the movement time and as a result it is possible to improve the precision of stopping at the time of stopping and to shorten the movement time. Further, changes in the movement time and movement distance may be flexibly dealt with as well, so it becomes possible to freely design characteristics of the movement time and movement distance.

Such an application can be expected to be of broad use in the control of various types of PTP (point to point) operations such as robot control, temperature control, camera focus control, slide control of a CD player, video disk, and the like, DC point control of electrical circuits, and the like.

What is claimed is:

1. A numerical control method for controlling an acceleration and deceleration of a controlled object based on a target function, comprising the steps of: computing the target function (Y(t)) with a value of change ($\Delta Y_r$), a normalized target function (y(t)), and correction values ($\beta, \delta$) and providing said target function as an input to a servo loop for controlling the acceleration and deceleration of said controlled object;

wherein for said correction values, when the normalized target function at the time of acceleration is $y_a(T)$, the normalized target function at the time of deceleration is $y_d(t)$, the acceleration time is $T_{pa}$, and the deceleration time is $T_{pd}$, the parameter defined by $$\delta_a(T_{pa}) = \frac{y_a(T_{pa})}{y_d(T_{pa})}$$

and $$\delta_d(T_{pd}) = \frac{y_d(T_{pd})}{y_d(T_{pd})}$$

is included in the target function ($Y_a(t)$) at the time of acceleration as $$\frac{\delta_a(T_{pa})}{\delta_a(T_{pa}) + \delta_d(T_{pd})}$$

or in the target function ($Y_d(t)$) at the time of deceleration as $$\frac{\delta_d(T_{pd})}{\delta_a(T_{pa}) + \delta_d(T_{pd})}.$$

2. A numerical control method as set forth in claim 1, wherein when said normalized target function at the time of acceleration is $y_a(T)$, said normalized target function at the time of deceleration is $y_d(t)$, the acceleration time is $T_{pa}$, and the deceleration time is $T_{pd}$, said correction value is expressed in the case of a target function ($Y_a(t)$) at the time of acceleration as $$\frac{\delta_a(T_{pa})}{\delta_a(T_{pa}) + \delta_d(T_{pd})} \cdot \beta_a$$

and in the case of a target function ($Y_d(t)$) at the time of deceleration as $$\frac{\delta_d(T_{pd})}{\delta_a(T_{pa}) + \delta_d(T_{pd})} \cdot \beta_d$$

and in that the parameters ($\beta_a, \beta_d$) are defined as $$\beta_a = \frac{1}{y_a(T_{pa})}$$

$$\beta_d = \frac{1}{y_d(T_{pd})}$$

3. A numerical control method as set forth in claim 2, wherein when said normalized target function is a triangular acceleration and deceleration curve, said parameters ($\beta_a, \beta_d$) are equal to 1.

4. A numerical control system for controlling an acceleration and deceleration of a controlled object based on a target function, comprising:

an input unit for receiving as inputs a value of change ($\Delta Y_r$) and a normalized target function (y(t));

a correction value calculation unit for calculating correction values ($\beta, \delta$) based on said value of change ($\Delta Y_r$) and normalized target function (y(t)); and a target function computation unit for computing the target function (Y(t)) based on the information from said input unit and said correction value calculation unit;

wherein an output of said target function computation unit is provided as an input to a servo control system for controlling the acceleration and deceleration of said controlled object and wherein for said correction values calculated by said correction value calculation unit, when said normalized target function at the time of acceleration is $y_a(T)$, said normalized target function at the time of deceleration is $y_d(t)$, said acceleration time is $T_{pa}$, and said deceleration time is $T_{pd}$, said parameter defined by $$\delta_a(T_{pa}) = \frac{y_a(T_{pa})}{y_d(T_{pa})}$$

and

-continued $$\delta_d(T_{pd}) = \frac{y_d(T_{pd})}{\dot{y}_d(T_{pd})}$$

is included in the target function ($Y_a(t)$) at the time of acceleration as $$\frac{\delta_a(T_{pa})}{\delta_a(T_{pa}) + \delta_a(T_{pd})}$$

or in the target function ($Y_d(t)$) at the time of deceleration as $$\frac{\delta_d(T_{pd})}{\delta_a(T_{pa}) + \delta_a(T_{pd})}.$$

5. A numerical control system as set forth in claim 4, wherein when said normalized target function at the time of acceleration is $Y_a(T)$, said normalized target function at the time of deceleration is $Y_d(t)$, said acceleration time is $T_{pa}$, and said deceleration time is $T_{pd}$, said correction value calculated by said correction value calculation unit is expressed in the case of a target function ($Y_a(t)$) at the time of acceleration as $$\frac{\delta_a(Tpa)}{\delta_a(Tpa) + \delta_a(Tpd)} - \beta_a$$

and in the case of a target function ($Y_d(t)$) at the time of deceleration as $$\frac{\delta_a(Tpd)}{\delta_a(Tpa) + \delta_a(Tpd)} - \beta_d$$

and in that the parameters ($\beta_a$, $\beta_d$) are defined as $$\beta_a = \frac{1}{y_a(Tpa)}$$

$$\beta_d = \frac{1}{y_d(Tpd)}.$$

6. An numerical control system as set forth in claim 5, wherein when said normalized target function is a triangular acceleration and deceleration curve, said parameters ($\beta_a$, $\beta_d$) are equal to 1.

* * * * *